United States Patent
Smith et al.

[11] 3,785,460
[45] Jan. 15, 1974

[54] LUBRICATOR

[75] Inventors: Roy B. Smith, Washington Court House; Alex T. Sabo, Cuyahoga Falls, both of Ohio

[73] Assignee: Samuel Moore & Company, Mantua, Ohio

[22] Filed: Feb. 15, 1972

[21] Appl. No.: 226,452

[52] U.S. Cl.................. 184/43, 64/17 A, 184/77
[51] Int. Cl............................................. F16n 7/36
[58] Field of Search.................... 184/77, 43, 70; 123/139 AL; 137/56; 64/17 A

[56] References Cited
UNITED STATES PATENTS

| | | | |
|---|---|---|---|
| 3,326,323 | 6/1967 | Delker | 184/43 X |
| 956,694 | 5/1910 | Ellis | 184/43 |
| 3,006,168 | 10/1961 | Kayser | 184/6 |
| 503,925 | 8/1893 | Bangs | 184/43 |
| 1,968,023 | 7/1934 | Bijur | 184/77 X |

*Primary Examiner*—Manuel A. Antonakas
*Attorney*—Clelle W. Upchurch

[57] ABSTRACT

An apparatus for lubricating a universal joint of a vehicle combines the cavity of a hollow drive shaft as a lubricant reservoir and a passageway through a member of the universal joint to its bearings with a conduit for transmitting lubricant from the reservoir to the passageway and a novel metering valve which opens and closes to lubricant flow into the conduit in response to the speed of rotation of the drive shaft.

10 Claims, 4 Drawing Figures

LUBRICATOR

This invention relates generally to a means for automatically lubricating the bearing surfaces of rotating members and more particularly to a system for lubricating trunnion bearings of a universal joint.

Universal joints used to connect two shafts may have a yoke on one end of each shaft connected together by a spyder. The spyder has a plurality of trunnions, usually four, extending radially from a centrally disposed body. The ends of the trunnions are rotatably secured in bearing blocks rigidly fixed in apertures in the arms of the yokes. Rotation of the drive shaft causes rotation of the yokes and spyder with the trunnions turning in the bearing blocks. It is frequently necessary to lubricate the bearing surfaces of the trunnions and bearing blocks to avoid wear. The most common practice in the past has been to provide passageways through the trunnions to the bearing surfaces. A universal joint adapted for manual greasing is disclosed in U.S. Pat. No. 2,802,351. A grease fitting is provided for periodically greasing the bearings through passageways in the trunnions of the spyder. Such a means for lubricating universal joints has the disadvantage of requiring periodic stops for lubrication and the additional disadvantage that it is necessary to install the fitting in a readily accessible position.

It has been proposed heretofore to provide automatic or self-lubricating systems for vehicles. A lubricant reservoir, pump and conduit system is usually installed to pump lubricant periodically to the various parts of a vehicle which require lubrication. Such systems are not used to lubricate joints which rotate like a universal joint because a conduit cannot be used to connect a stationary pump to the rotating member.

Apparatus for automatically lubricating relative rotatable members are disclosed in U.S. Pat. Nos. 3,006,168 and 3,326,323. The self-lubricating universal joint disclosed in U.S. Pat. No. 3,006,168 uses a cavity in the yoke as a main reservoir and a smaller auxiliary reservoir in a sleeve between the yoke and spyder. Rotation of the joint transmits lubricant from the auxiliary reservoir to the bearings. Such a device has the disadvantage that the main reservoir is necessarily relatively small and requires frequent refilling with lubricant. The greasing mechanism disclosed in U.S. Pat. No. 3,326,323 also provides a reservoir for lubricant in the shank or arm of the yoke of a universal joint. A plug closes the yoke shank to seal the lubricant in the cavity therein. A plunger extends transversely through the plug and has a weight on one end externally of the drive shaft. As the yoke rotates, the weighted end of the plunger moves outwardly from the yoke shank and pulls that portion of the plunger which extends across the cavity. The plunger forces lubricant into a passageway leading to a conduit connected to the spyder as it is pulled by its weighted end. The conduit used as a reservoir holds a relatively small volume of lubricant. Furthermore, the apparatus requires a specially built or modified yoke in order to install the spring and follower disc. Lubricant is under constant pressure exerted by the spring, which must be made of a heavy wire in order to overcome the action of the centrifugal force, which tends to cavitate the center of the lubricant, keeping it away from the pump inlet which is close to the center of the shaft.

It is an object of this invention to provide an improved lubricating system for automatically lubricating the bearings of a universal joint. Another object of the invention is to provide an apparatus for automatically lubricating the surface between the trunnion of a spyder and the bearing block carried by a yoke of a universal joint. A more specific object of the invention is to provide an apparatus for lubricating bearings of a universal joint which combines a large reservoir with a relatively simple but effective valve responsive to the speed of rotation of the reservoir.

It is the further object of this invention to provide a metering valve for positive displacement of metering lubricant to the universal joints according to requirements.

Another object of this invention is to provide an automatic lubrication device, which lends itself to be installed on existing equipment, such as the drive shaft of a truck.

Other objects will become apparent from the following description with reference to the accompanying drawing in which.

The objects of the invention are accomplished, generally speaking, by providing a system for automatically delivering metered volumes of lubricant to bearings of a universal joint which combines a sealed hollow drive shaft, a universal joint having passageways leading to the bearings thereof and a metering valve mounted on the wall of the drive shaft which delivers a measured volume of lubricant in response to the speed of rotation of the drive shaft from the cavity in the drive shaft to the bearings. Lubricant is stored in the hollow drive shaft. The apparatus provided by the invention is particularly advantageous for vehicles having a universal joint at each end of the drive shaft because a plurality of valves can be installed in threaded apertures in the wall of the drive shaft to provide lubrication through more than one conduit. As will be explained in more detail hereinafter, the metering valve is designed to be open to the passage of lubricant therethrough at drive shaft speeds of low revolutions per minute but closed when the drive shaft is at normal or greater highway speeds.

Figure 1:
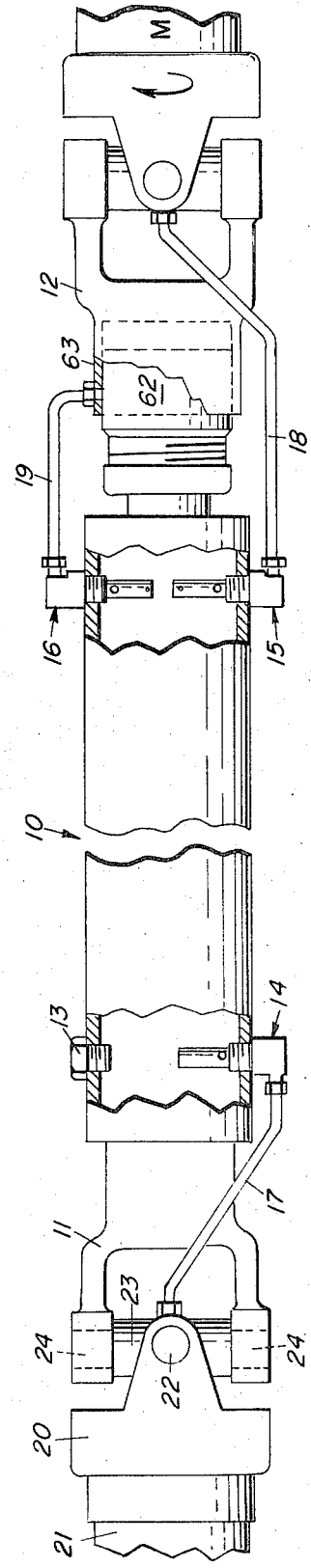
FIG. 1 is a fragmentary plan view, partially in section, of one embodiment of the invention.

Referring now to FIG. 1 of the drawing, a hollow drive shaft 10 of a vehicle is driven by a suitable motor M and has yokes 11 and 12 rigidly secured to the ends thereof for rotation therewith. A plug 13 may be removed to provide an opening for filling the cavity of the shaft 10 with a suitably fluid lubricant. Metering valves 14, 15 and 16 are connected to one end of flexible hoses 17, 18 and 19, respectively, with suitable threaded fittings.

Figure 2:
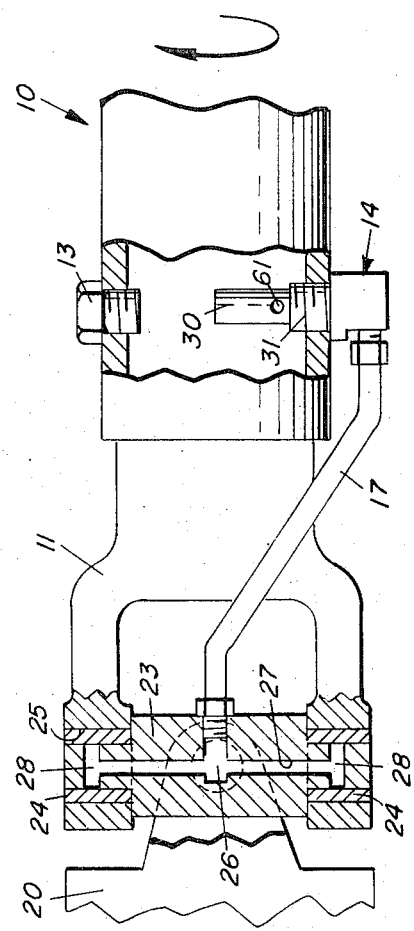
FIG. 2 is an enlarged longitudinal section through one embodiment of a yoke and trunnion assembly of a universal joint.

As illustrated in FIGS. 1 and 2, yoke 11 is rotatably connected by a spyder 22 to a yoke 20 rigidly secured to the end of a driven shaft 21. Spyder 22 has four radially extending trunnions 23. Two of trunnions 23 have their ends rotatably secured in bearing boxes 24 carried in apertures 25 by the arms of yoke 11. The remaining two diametrically opposite trunnions 23 are disposed in similar bearing boxes in apertures of yoke 20.

As illustrated in FIG. 2, a passageway 26 is drilled from the surface of spyder 22 until it intersects cross-passageway 27 extending longitudinally through trunnion 23. A passageway 28 extends from passageway 27 to between the facing surfaces of trunnion 23 and bearing box 24. A suitable fitting on the end of conduit 17 connects it to spyder 22 in communication with passageway 26.

Figure 3:
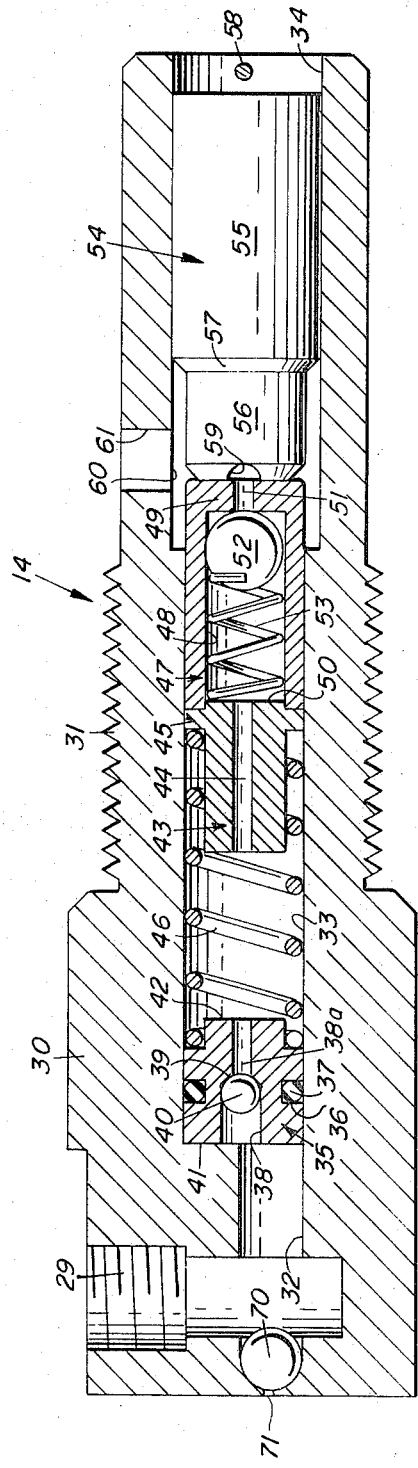
FIG. 3 is an enlarged longitudinal section of one embodiment of a metering valve adapted to be used in the apparatus of the invention illustrating the metering valve open to the passage of lubricant therethrough.
Figure 4:
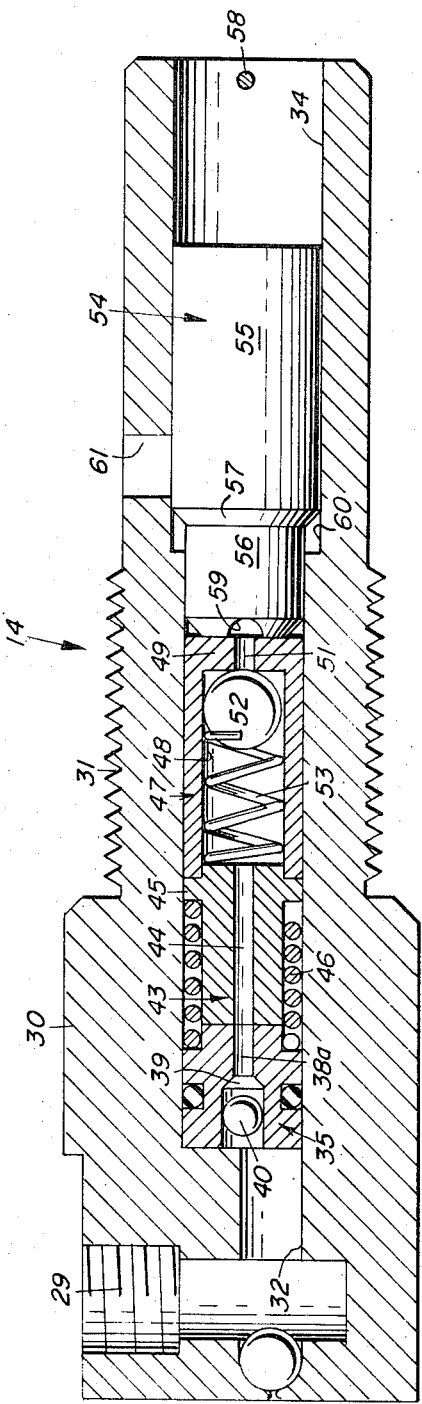
FIG. 4 is a longitudinal section of the metering valve of FIG. 3 illustrated in its closed position.

Metering valves 14, 15 and 16 have the same construction so they will all be described simultaneously by reference to metering valve 14. Metering valve 14, as illustrated in FIGS. 3 and 4, has a housing 30. Metering valve 14 has external threads 31 for securing it in the wall of shaft 10. An internally threaded opening 29 is provided for connecting valve 14 to a fitting on conduit 17. Ball 70 closes opening 71. Opening 71 permits the drilling of chamber 32 when manufacturing the metering valve and may be closed with a plug or other closure instead of with ball 70, if desired. A longitudinal bore divided into a first passageway or chamber 32, a second passageway or chamber 33 of greater cross-section than chamber 32 and a third passageway or chamber 34 of greater cross-section than chamber 33 extends through metering valve 14. Opening 29 communicates with chamber 32. Brass plug-like member 35 has an annular groove 36 in its outer surface and a bore extending longitudinally therethrough. Plug 35 is stationary. An O-ring 37 disposed in groove 36 seals chamber 33 against fluid flow about member 35. The bore through member 35 is larger in cross-section adjacent chamber 32 than it is adjacent its opposite end providing passageways 38 and 38a. The two passageways 38 and 38a intersect in shoulder 39. A ball 40 is confined in chamber 38 between shoulder 39 and the shoulder 41 at the point where chambers 32 and 33 meet. Plug 35 has an embossment 42 on the end adjacent bore 38a. A slidable piston member 43 has a bore 44 aligned with bore 38a. The cross-section of member 43 is less than that of chamber 33 except for an integral annular ring or flange 45 thereabout which fits slidably in chamber 33. A spring 46 is confined between member 35 and ring 45 in an annular space about member 43. A second slidable piston member 47 having a longitudinal bore 48 with an open end adjacent member 43 and an opposite closed end 49 is slidably disposed in chamber 33. The wall of chamber 47 forms a substantially fluid impervious seal with the wall of chamber 33. The bore 48 has a cross-section about equal to the cross-section of the body of member 43 and the wall of member 47 is adapted to fit around the end 50 of member 43 and rest against annular integral ring 45. An opening 51 of less cross-section than that of bore 48 extends through the otherwise closed end 49 of piston 57. A ball 52 is biased against the inner wall of end 49 in bore 48 by a spring 53.

A third piston 54 is slidably disposed in chamber 34. Piston 54 has a body 55 which engages the wall of chamber 34 and is slidable longitudinally therein. Piston 54 is a counterweight responsive to centrifugal force. That end of piston 54 adjacent member 43 is an embossment 56 having a cross-section about equal to the cross-section of chamber 33 and adapted to slide therein. A shoulder 57 is formed at the point where body 55 and embossment 56 are joined. Preferably, embossment 57 and body 55 are joined by a sloping surface as shown in FIG. 3. A pin 58 prevents piston 54 from escaping from passageway 34. A transverse channel 59 through the end of embossment 56 communicates with the annular space 60 about piston 54 when it is in the position shown in FIG. 3.

Metering valve 14 is illustrated in FIG. 3 with spring 46 biasing pistons 43, 47 and 54 towards the pin 58 and the open end of metering valve 14. In this position an annular space 60 is provided around boss 56 of piston 54. Inlet openings 61 in housing 30 are open to permit lubricant to enter annular space 60. Pistons 43, 47 and 54 are disposed in passageway 34 as shown in FIG. 3 when spring 46 exerts a force thereagainst greater than the centrifugal force of the rotating shaft 10. This occurs when shaft 10 is at rest or the speed of rotation thereof is too slow to develop a centrifugal force great enough to overcome the biasing action of spring 46 with the weight of piston 54.

Metering valve 14 is illustrated in FIG. 4 with members 43, 47 and 54 positioned as they would be when shaft 10 is rotating at a speed which develops a centrifugal force greater than the biasing action of spring 46. In this position piston 54 has been moved outwardly from the axis of shaft 10 or to the left as in FIG. 4 and has pushed member 47 towards the left in FIG. 4. Member 47 in turn has engaged ring 45 and forced member 43 against boss 42 on member 35. This closes chamber 33 and the volume of lubricant which had been stored in chamber 33 is forced out of the metering valve 14. The volume of lubricant displaced from chamber 33 is determined by coordination of the chambers dimensions with the length of member 43. Piston 54 acts as a counterweight and is moved into the position shown in FIG. 4 when the centrifugal force developed by rotation of the drive shaft is sufficient to move piston 54. Hence, the closing of opening 61 is determined by the RPM of the shaft 10, the weight of piston 54 and the biasing action of spring 46. Ordinary operation of a vehicle is usually at a drive shaft speed of about 2,000 RPM or more so the weight of piston 54 may be such that it will move forward and actuate member 47 at a speed less than 2,000 RPM; for example, from about 1,200 to about 1,400 RPM. As indicated above, the volume of lubricant delivered to blocks 24 depends upon the length of travel of piston 47 which can be adjustable in length or have a length predetermined when it is made. A metered amount of lubricant is delivered from metering valve 14 when piston 54 urges piston 47 forward to displace lubricant trapped in chamber 33 through passageways 38a and 38 into conduit 17 and passageways 27 and 28 to bearing blocks 24 and 25. Chamber 33 may be refilled when the drive shaft 10 is rotating at slow speeds of say about 400 RPM with piston 54 disposed in the position shown in FIG. 3. Lubricant around metering valves 14, 15 and 16 in shaft 10 enters annular space 60 through inlet 61 and moves through channel 59. When the biasing action of spring 53 is overcome by centrifugal force, ball 51 moves away from opening 51.

Conduit 18 leads to a universal joint similar to the one described with reference to yoke 11. However, conduit 19 leads to a fitting in yoke 12 which communicates with the space between the parallel surfaces of inner wall 62 of yoke 12 and the outer wall of member 63. Yoke 12 may slide longitudinally over member 63 and requires lubrication.

The piston in chamber 33 is illustrated as two separate units 43 and 47. It may be a single part, if desired.

Although the invention has been described in detail for the purpose of illustration, it is to be understood that such detail is solely for that purpose and that variations can be made by those skilled in the art without departing from the spirit and scope of the invention except as it may be limited by the claims.

We claim:

1. An apparatus for lubricating the bearings of a spyder and yoke of a universal joint between a drive shaft and a driven shaft, said spyder and yoke having means for flow of lubricant to the bearings from an external opening in the spyder, said apparatus comprising a drive shaft having a cavity therein for storing a supply of lubricant, and a metering valve having a housing with a bore therein carried by the drive shaft, said bore being divided into a first passageway which communicates with a means for conveying lubricant to the said opening in the spyder and with a second passageway, a first member disposed in said second passageway forming a fluid impervious seal thereabout, a bore longitudinally through the first member, a check valve in the bore in the first member adapted to open under applied pressure towards the first passageway, a first piston slidable in said second passageway, means for biasing said first piston away from the first member in the absence of applied pressure towards the conduit, said first piston having a longitudinal bore therethrough communicating with the bore in the first member, a third passageway of greater cross-section than the second passageway, a second piston slidable in the third passageway and having an annular space around its forward end, means for lubricant to pass from the annular space to the bore in the first piston, said second piston being adapted to slide longitudinally in response to the said first piston as the latter is biased away from the first member and to slide towards the first passageway when applied pressure from centrifugal force developed as the shaft rotates exceeds the biasing force on said first piston, and inlet means in said housing for entrance of lubricant into the annular space from the drive shaft cavity when the first and second pistons are positioned by the said biasing means and to be closed by the second piston when the centrifugal force exceeds the force of the biasing means against the first and second pistons.

2. The apparatus of claim 1 wherein a universal joint is attached to each end of the drive shaft and a metering valve is disposed near each end of the shaft and connected to a conduit leading to a universal joint.

3. The metering valve of claim 1 wherein the weight of the second piston and the said biasing means against the first piston are selected to provide movement of the first piston through said space when the valve rotates at from about 1,200 to about 1,400 revolutions per minute.

4. An apparatus for lubricating the bearings of a spyder and yoke of a universal joint between a drive shaft and a driven shaft, said spyder and yoke having means for flow of lubricant to the bearings from an external opening in the spyder, said apparatus comprising a drive shaft having a cavity therein for storing a supply of lubricant, and a metering valve having a housing with a bore therein carried by the drive shaft, said bore being divided into first, second and third passageways with the first passageway disposed between means for carrying lubricant to the spyder and the second passageway, said second passageway having a greater cross-section than the first passageway and said third passageway having a greater cross-section than the second, a first piston having a bore therethrough slidably disposed in the second passageway, a check valve between the first and second passageways adapted to open under pressure developed in the second chamber as the first piston moves towards the first passageway, means for biasing the first piston from the first passageway, a second piston slidably disposed in the third passageway, inlet means for flow of lubricant into the third passageway from the drive shaft cavity, said second piston being adapted to slide towards the second passageway when the drive shaft rotates at a speed which develops a force greater than that of said biasing means to close said inlet and to push the first piston towards the check valve and force lubricant from the second to the first passageway.

5. The apparatus of claim 4 wherein the drive shaft is hollow and the cavity extends substantially throughout its length, the metering valve is threadably secured to the shaft and extends into the cavity and discharges a metered amount of lubricant into the bearings at a predetermined shaft speed.

6. The apparatus of claim 4 wherein said spyder has a lubricant passageway extending through its trunnions to the bearing boxes and means for connecting the conduit to the passageway in the trunnions.

7. An apparatus for lubricating the bearings of a spyder and yoke of a universal joint between a drive shaft and a driven shaft, said spyder and yoke having means for flow of lubricant to the bearings from an external opening in the spyder, said apparatus comprising a drive shaft having a cavity therein for storing a supply of lubricant, and a metering valve having a housing with a bore therein carried by the drive shaft, wherein said bore extends longitudinally through the housing, one end of the metering valve is connected to a conduit and the opposite end is open and disposed in the said cavity, said bore being divided into a first passageway communicating with the conduit and a second passageway of greater cross-section and a third passageway of greater cross-section than that of the second passageway, a first shoulder at the intersection of the first and second passageways and a second shoulder between the second and third passageways, a plug disposed in the first passageway with one end on the first shoulder and forming a substantially fluid impervious seal between the first and second passageways about the said first member, a longitudinal bore through the plug having a larger cross-section adjacent the first passageway than adjacent the second passageway with a shoulder formed at the junction of the two portions of different cross-section, a ball confined in the portion of the bore of largest cross-section between the last said shoulder and the first said shoulder, an embossment on the plug facing a first slidable piston in the second passageway, said first slidable piston having a longitudinal bore therethrough with a first chamber aligned with the bore through the plug and a second chamber of greater cross-section adjacent thereto providing a third shoulder, a third chamber of said bore of less cross-section than the second chamber with a fourth shoulder therebetween and communicating between the second chamber and said third passageway, a ball confined in said second chamber and a spring biasing said ball against the fourth shoulder, a slidable piston in the third passageway having a body and an embossment facing the first piston, an annular space between the embossment and wall of the third passageway, a groove in said embossment communicating between the said third passageway and the annular space, inlet means in the housing adjacent the annular space for lubricant to pass into the annular space, means comprising a spring in the second passageway about the first piston for biasing the first piston towards the third passageway, said second piston being slidably responsive in said third passageway to the biasing action of the last said spring and to centrifugal force when the drive shaft is rotating at a predetermined speed whereby said embossment is adjacent the inlet means when the drive shaft is at rest and at slow rotating speeds and said piston body is adjacent the inlet means at greater speeds.

8. The apparatus of claim 7 wherein said plug has an annular groove therein and an O-ring in the groove, said first piston has two parts, a first part of less cross-section than the cross-section of the second passageway and having that portion of the bore which is of lesser cross-section, and an annular integral ring about the periphery thereof which fits snugly in the second passageway, a biasing spring about the said first part between the annular ring and the first member, and a separate second part of said first piston which has the said larger bore therein which encloses the check valve.

9. A metering valve for delivering metered amounts of a fluid in response to centrifugal force of a rotating member which carries the valve, said valve comprising a housing having a bore extending therethrough, longitudinally spaced inlet and outlet means through the housing into the bore, said bore being divided into a first chamber adjacent the said outlet, a third chamber adjacent the inlet and a second intermediate chamber greater in cross-section than one of the other said chambers and less in cross-section than the remaining said chamber, means in the intermediate chamber for storing a measured volume of fluid comprising a piston slidable longitudinally therein, means for biasing the piston from that end of the intermediate chamber which is adjacent the said first chamber to provide a space for fluid storage when the valve is not rotating, and means responsive to centrifugal force for urging the piston through the space and delivering a volume of fluid substantially equal in volume to the volume of the storage means when the valve is rotated.

10. A metering valve for delivering metered amounts of a fluid in response to centrifugal force, said valve having a housing carrying external threads adapted to threadably mount the metering valve in a housing of a hollow rotatable member containing lubricant in the cavity thereof, said valve housing having a bore extending longitudinally therethrough, inlet means communicating between said cavity and the said bore, an outlet communicating with said bore and having means for attachment to a bearing requiring lubrication, said longitudinal bore having a first chamber communicating with the outlet, a second intermediate chamber of greater cross-section than the first chamber, a third chamber of greater cross-section than the second chamber, said housing having inlet means into the third chamber, a stationary plug disposed in the second chamber adjacent the first chamber, a bore extending through the plug from the first chamber to the second chamber, a check valve in the said bore adapted to close the bore when pressure in the first chamber exceeds that in the second chamber and to open the bore when the pressure in the second chamber exceeds that in the first chamber, a piston disposed in the second chamber in slidable engagement with the wall of the chamber, the sum of the longitudinal dimensions of the plug and piston being less than the length of the second chamber to provide a space of predetermined volume in the second chamber adapted to be filled with a lubricant, a bore through the piston communicating between the second and third chambers, means for biasing the piston from the plug to provide the said space therebetween when the valve is at rest, a check valve in the bore of the piston, adapted to close against lubricant flow when the valve is at rest and to open when the valve is rotated, and means comprising a weight disposed in the third chamber in engagement with the walls thereof and slidable longitudinally therein in response to centrifugal force developed by rotation of the valve into engagement with the piston and overcome the biasing action against the piston and move the piston through said space and force the lubricant therefrom.

* * * * *